(12) United States Patent
Yamamoto et al.

(10) Patent No.: US 11,990,151 B2
(45) Date of Patent: May 21, 2024

(54) PARTICULAR-SOUND DETECTOR AND METHOD, AND PROGRAM

(71) Applicant: Sony Group Corporation, Tokyo (JP)

(72) Inventors: Yuki Yamamoto, Tokyo (JP); Yuji Tokozume, Tokyo (JP); Toru Chinen, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 257 days.

(21) Appl. No.: 17/415,648

(22) PCT Filed: Dec. 12, 2019

(86) PCT No.: PCT/JP2019/048706
§ 371 (c)(1),
(2) Date: Jun. 17, 2021

(87) PCT Pub. No.: WO2020/137585
PCT Pub. Date: Jul. 2, 2020

(65) Prior Publication Data
US 2022/0059120 A1 Feb. 24, 2022

(30) Foreign Application Priority Data
Dec. 25, 2018 (JP) .................................. 2018-240642

(51) Int. Cl.
*G10L 25/51* (2013.01)
*G06N 3/04* (2023.01)
(Continued)

(52) U.S. Cl.
CPC ................ *G10L 25/51* (2013.01); *G06N 3/04* (2013.01); *G10K 11/17875* (2018.01);
(Continued)

(58) Field of Classification Search
CPC .......... H04R 3/005; H04R 1/406; H04R 3/04; H04R 2430/20; H04R 25/507;
(Continued)

(56) References Cited

U.S. PATENT DOCUMENTS 5,960,391 A * 9/1999 Tateishi ............... G10L 21/0272
704/232
9,099,094 B2 * 8/2015 Burnett ............... G10L 21/0208
(Continued)

FOREIGN PATENT DOCUMENTS

JP 2011-097268 A 5/2011

OTHER PUBLICATIONS

International Search Report and English translation thereof dated Jan. 28, 2020 in connection with International Application No. PCT/JP2019/048706.

*Primary Examiner* — Lun-See Lao
(74) *Attorney, Agent, or Firm* — Wolf, Greenfield & Sacks, P.C.

(57) ABSTRACT

The present technology relates to a particular-sound detector and method, and a program that make it possible to improve the performance of detecting particular sounds.
The particular-sound detector includes a particular-sound detecting section that detects a particular sound on a basis of a plurality of audio signals obtained by collecting sounds by a plurality of microphones provided to a wearable device. In addition, the plurality of the microphones includes two microphones that are equidistant at least from a sound source of the particular sound, and one microphone arranged at a predetermined position. The present technology can be applied to headphones.

15 Claims, 12 Drawing Sheets

(51) Int. Cl.
*G10K 11/178* (2006.01)
*G10L 25/30* (2013.01)
*H04R 1/04* (2006.01)
*H04R 1/40* (2006.01)
*H04R 3/00* (2006.01)

(52) U.S. Cl.
CPC ............... *G10L 25/30* (2013.01); *H04R 1/04* (2013.01); *H04R 1/406* (2013.01); *H04R 3/005* (2013.01); *G10K 2210/1081* (2013.01); *G10K 2210/3026* (2013.01)

(58) Field of Classification Search
CPC ............ H04R 2201/401; H04R 25/407; H04R 25/554; H04R 2225/43; H04R 2420/07; H04R 25/552; H04R 5/033; H04R 1/1008; H04R 2460/13; H04R 1/04; H04R 27/00; H04R 3/12; H04R 1/403; H04R 2430/03; H04R 2430/23; H04R 2499/13; H04R 29/001; H04R 1/1041; H04R 2201/405; H04R 2420/01; H04R 3/00; H04R 5/027; H04R 1/1083; H04R 25/405; H04R 25/43; H04R 29/005; H04R 1/028; H04R 1/1091; H04R 1/222; H04R 1/326; H04R 17/02; H04R 19/005; H04R 2201/003; H04R 2203/12; H04R 2410/07; H04R 2430/21; H04R 25/356; H04R 25/70; H04R 3/002; H04R 3/06; H04R 3/10; H04R 7/26; H04R 1/08; H04R 1/1075; H04R 1/2876; H04R 2201/107; H04R 2201/403; H04R 2225/41; H04R 2460/01; G10L 15/005; G10L 15/25; G10L 15/28; G10L 17/02; G10L 17/04; G10L 17/10; G10L 17/18; G10L 17/22; G10L 19/008; G10L 19/167; G10L 19/18; G10L 19/22; G10L 2015/0635; G10L 2021/02163; G10L 21/007; G10L 21/013; G10L 21/0364; G10L 25/21; G10L 25/48
USPC ........................................ 381/56–58, 92, 74
See application file for complete search history.

(56) References Cited

U.S. PATENT DOCUMENTS

| | | | |
|---|---|---|---|
| 9,854,356 B2* | 12/2017 | Yamkovoy | G10K 11/17861 |
| 10,460,718 B2* | 10/2019 | Sibbald | G10K 11/17861 |
| 2003/0115068 A1* | 6/2003 | Boesen | G10L 15/26 |
| | | | 704/277 |
| 2010/0172519 A1* | 7/2010 | Kimura | H04R 1/1008 |
| | | | 381/151 |
| 2011/0096939 A1 | 4/2011 | Ichimura | |
| 2011/0243343 A1* | 10/2011 | Gauger, Jr. | G10K 11/16 |
| | | | 381/71.6 |

* cited by examiner

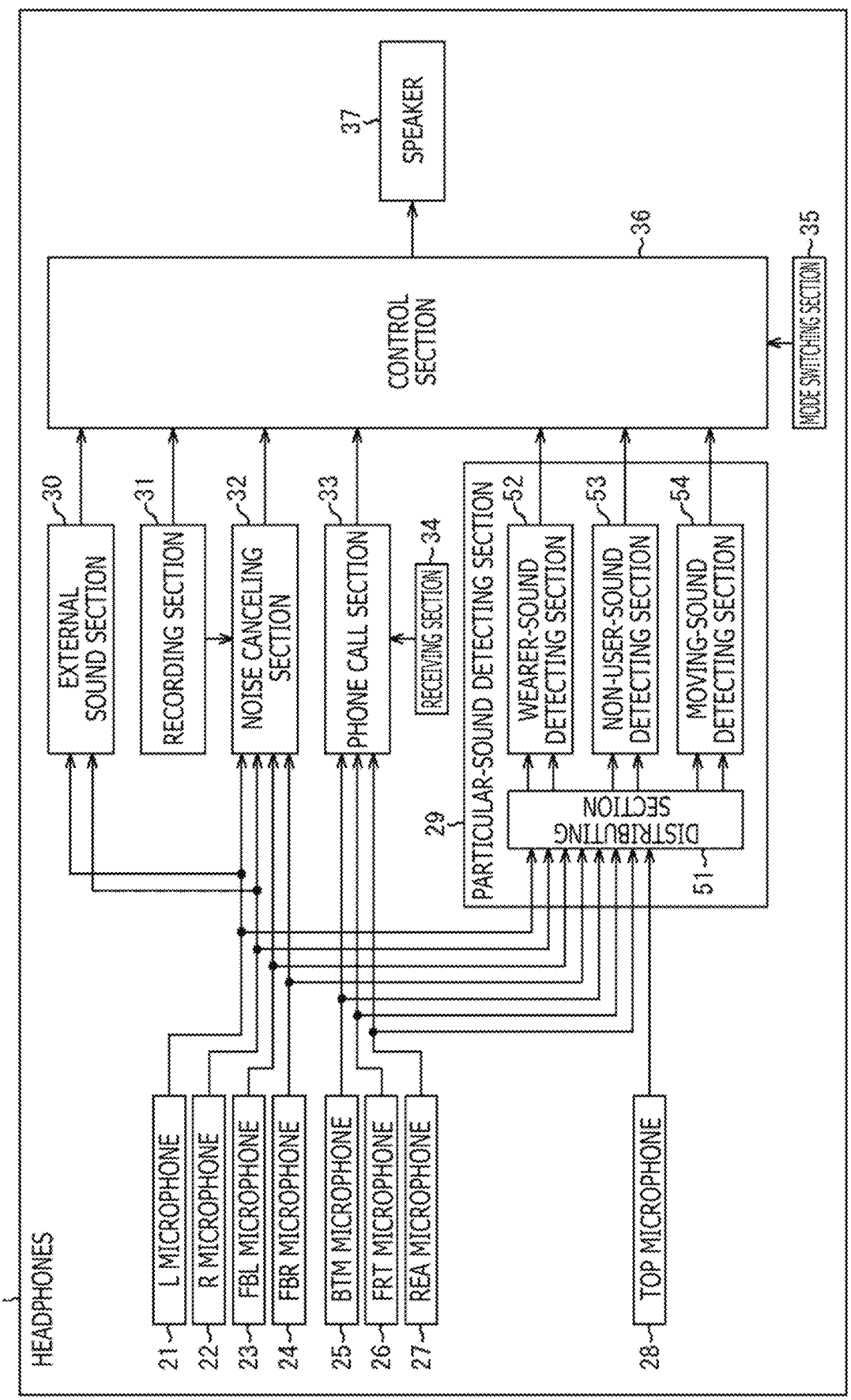

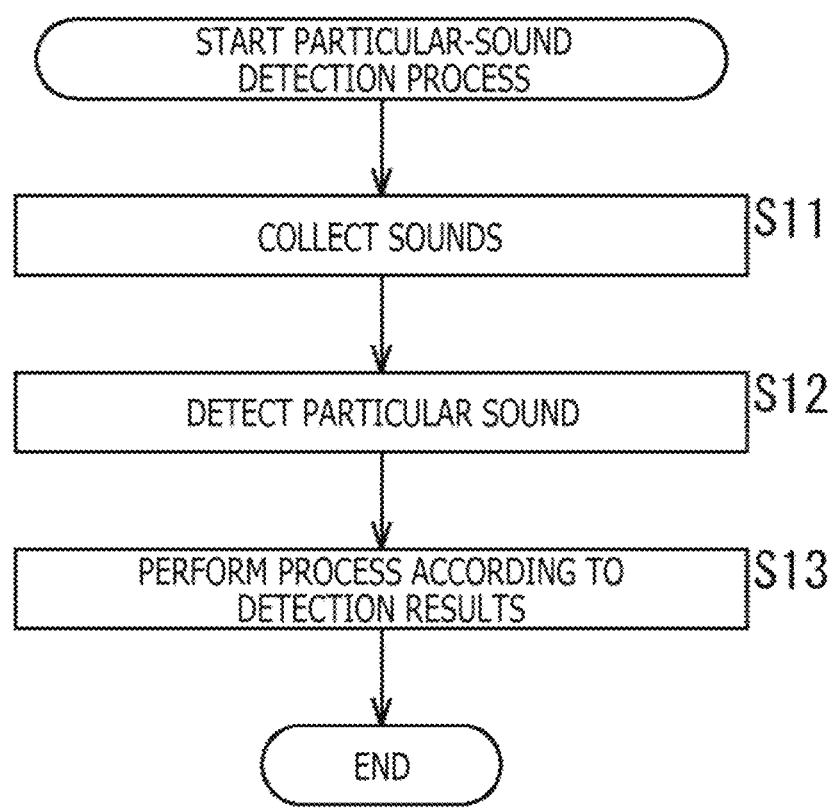

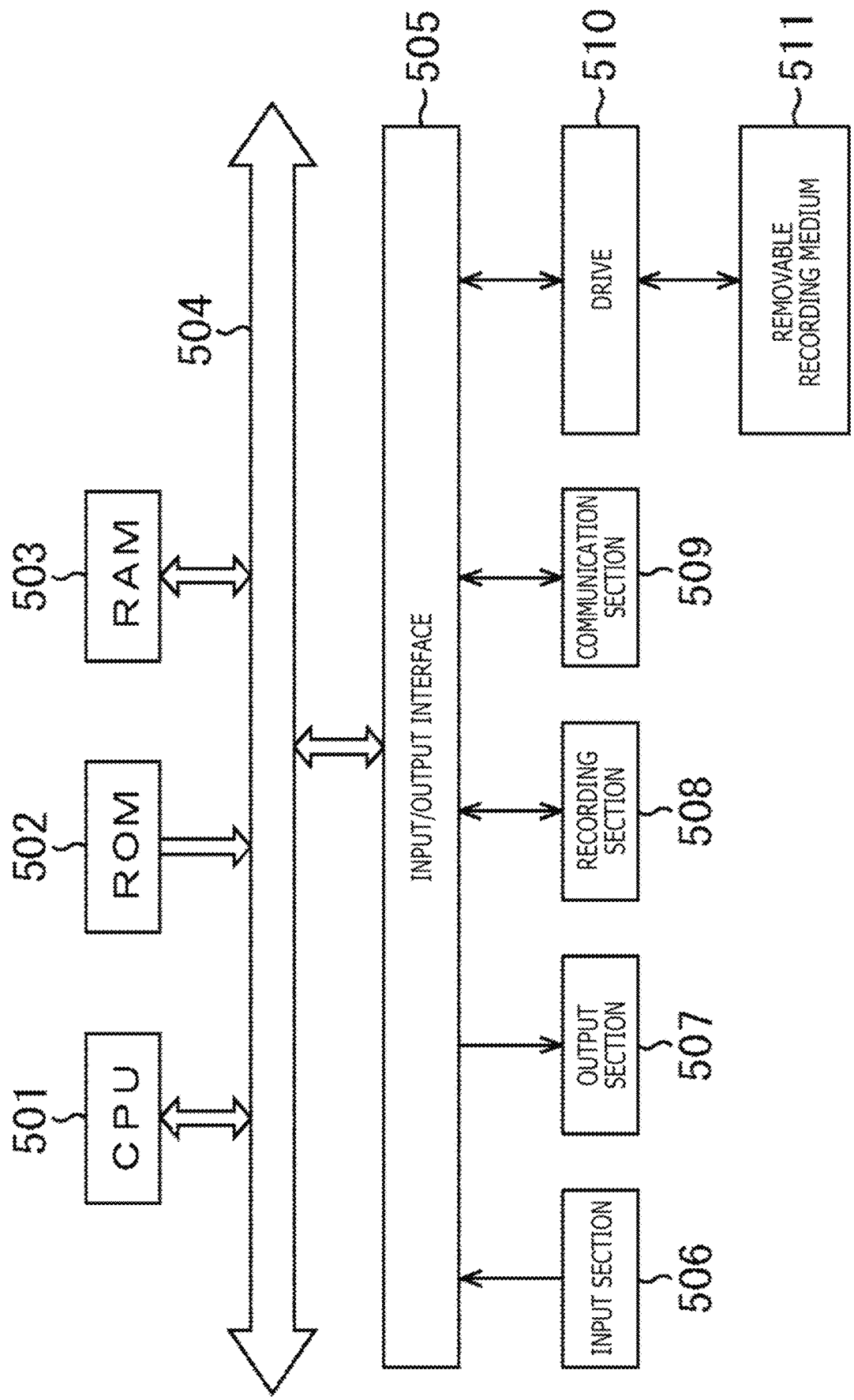

PARTICULAR-SOUND DETECTOR AND METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/048706, filed in the Japanese Patent Office as a Receiving Office on Dec. 12, 2019, which claims priority to Japanese Patent Application Number JP2018-240642, filed in the Japanese Patent Office on Dec. 25, 2018, each of which is hereby incorporated by reference in its entirety.

TECHNICAL FIELD

The present technology relates to a particular-sound detector and method, and a program, and, in particular, relates to a particular-sound detector and method, and a program that are configured to make it possible to improve the performance of detecting particular sounds.

BACKGROUND ART

There are conventionally known technologies for particular-sound detection in which it is detected whether a sound based on an audio signal acquired by a microphone includes a sound which is a particular one (hereinafter, referred to as a particular sound) such as the voice of a human or a driving sound of a vehicle, on the basis of the audio signal.

For example, as one of such technologies, there is a proposed technology in which microphones provided to headphones are used to detect a conversation of a wearer of the headphones, and the headphones switch to a conversation mode if a conversation is detected (see PTL 1, for example).

CITATION LIST

Patent Literature

[PTL 1]
JP 2011-97268A

SUMMARY

Technical Problem

Meanwhile, when it is attempted to detect a particular sound, sufficient detection performance cannot be attained in some cases depending on the arrangement of microphones or the like.

The present technology has been made in view of such a circumstance, and aims to make it possible to improve the performance of detecting particular sounds.

Solution to Problem

A particular-sound detector according to one aspect of the present technology includes a particular-sound detecting section that detects a particular sound on a basis of a plurality of audio signals obtained by collecting sounds by a plurality of microphones provided to a wearable device. The plurality of the microphones includes two microphones that are equidistant at least from a sound source of the particular sound, and one microphone arranged at a predetermined position.

A particular-sound detection method or program according to one aspect of the present technology includes a step of detecting a particular sound on a basis of a plurality of audio signals obtained by collecting sounds by a plurality of microphones provided to a wearable device. The plurality of the microphones includes two microphones that are equidistant at least from a sound source of the particular sound, and one microphone arranged at a predetermined position.

In one aspect of the present technology, a particular sound is detected on a basis of a plurality of audio signals obtained by collecting sounds by a plurality of microphones provided to a wearable device. In addition, the plurality of the microphones includes two microphones that are equidistant at least from a sound source of the particular sound, and one microphone arranged at a predetermined position.

BRIEF DESCRIPTION OF DRAWINGS

FIG. 11 is a figure depicting a functional-configuration example of the headphones.

FIG. 12 is a flowchart for explaining a particular-sound detection process.

FIG. 13 is a figure depicting a configuration example of a computer.

DESCRIPTION OF EMBODIMENTS

In the following, embodiments to which the present technology is applied are explained with reference to the drawings.

First Embodiment

About False Detection at the Time of Particular-Sound Detection

The present technology aims to make it possible to improve the performance of detecting particular sounds by detecting the particular sounds on the basis of each of plural audio signals acquired by plural microphones.

Note that the particular sounds to be detection targets that are sounds which are particular ones may be any sounds. In addition, the microphones used for particular-sound detection can be ones that are provided to a wearable device worn by a user, for example.

The wearable device may be any wearable device as long as it can be worn by a user, such as overhead headphones, true wireless headphones whose sections to be worn on the left and right ears are not connected physically, or a head-mount display, for example.

In an example explained below, as a particular sound, at least any of the voice of a wearer of headphones, the voice of a human other than the wearer of the headphones, an announcement sound, a driving sound of a vehicle, and a horn sound emitted by a vehicle or the like is detected by a plurality of microphones provided to the headphones.

In a case where particular-sound detection is to be performed, it is difficult to attain sufficient detection performance if one microphone is used.

Figure 1:
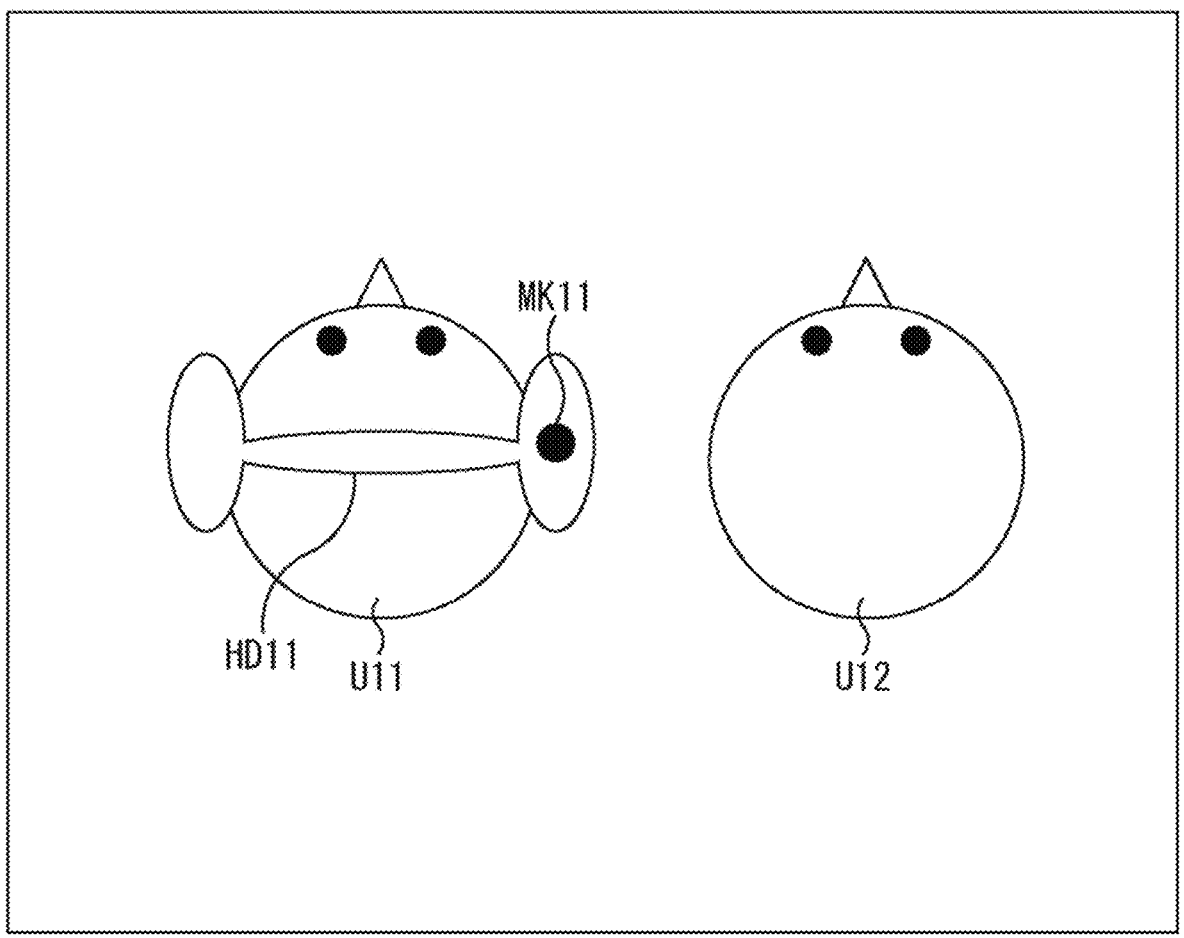
FIG. 1 is a figure for explaining particular-sound detection by using a microphone.

As depicted in FIG. 1, for example, it is supposed that there is a user U11 who is a headphone wearer having overhead headphones HD11 provided with one microphone MK11 on, and there is another user U12 near the user U11.

In such a case, when the voice of the user U11, who is a headphone wearer, is to be detected as a particular sound on the basis of audio signals obtained by the microphone MK11 collecting sounds, the voice of the user U12, who is not a headphone wearer, is detected as a particular sound by an error undesirably, in some cases. That is, false detection occurs in some cases.

In detecting the voice of the user U11 as a particular sound, methods for detecting a particular sound in a case where the user U11 can be any human differ from methods for detecting a particular sound in a case where the user U11 is a predetermined particular human, but in both cases, false detection occurs undesirably.

Here, the case where the user U11 can be any human, and the case where the user U11 is a predetermined particular human are explained further.

First, there is a method for the case where the user U11 can be any human in which a detector including a neural network that detects the voice of any human, or the like is generated by machine learning, and the obtained detector is used to detect the voice of the user U11, who is a headphone wearer, as a particular sound.

In a case where such a method is adopted, false detection occurs in the example depicted in FIG. 1.

That is, in the example depicted in FIG. 1, the distance from the mouth of the user U11 who can be any headphone wearer to the microphone MK11, and the distance from the mouth of the user U12, who is not a headphone wearer, to the microphone MK11 are approximately the same (equidistant).

Accordingly, the sound pressures of audio signals of the voice of the user U11 and the voice of the user U12 acquired by the microphone MK11 are approximately equal, and are the same "human voices."

Accordingly, it is difficult in this example to identify the voice of the user U11 who can be any headphone wearer and the voice of the user U12 who is not a headphone wearer by a detector. As a result, false detection in which the voice of a user (human) other than the user U11, who is a headphone wearer, that is, the voice of the user U12 here, is detected as a particular sound occurs undesirably.

In addition, there is a method in which a detector that detects the voice of a predetermined particular human, that is, here the voice of the particular user U11, who is a headphone wearer, is generated by machine learning, and the detector is used to detect the voice of the user U11, who is the headphone wearer, as a particular sound.

It is supposed that such a method is adopted to detect the voice of the predetermined particular user U11 as a particular sound in the example depicted in FIG. 1.

In the example depicted in FIG. 1, the distance from the mouth of the user U11, who is a particular headphone wearer, to the microphone MK11, and the distance from the mouth of the user U12, who is not a headphone wearer, to the microphone MK11 are approximately the same.

Accordingly, similarly to the case where the user U11 can be any human, the sound pressures of audio signals of the voice of the user U11, and the voice of the user U12 acquired by the microphone MK11 are approximately equal, but because the voice of the user U11 and the voice of the user U12 are different, it becomes less likely for false particular-sound detection to occur than in the case mentioned above that the user U11 can be any human.

However, even in such a case, if the voice of the user U11 sounds like the voice of the user U12, false detection in which the voice of the user U12, who is another user other than the user U11, is detected as a particular sound occurs undesirably in some cases.

In view of this, the present technology makes it possible to suppress the occurrence of false detection, by detecting a particular sound on the basis of each of audio signals acquired by a plurality of microphones.

In particular, the present technology makes it possible to improve the performance of detecting particular sounds not only by using a plurality of microphones, but also by designing the arrangement of the microphones in an ingenious manner, and in particular by designing the distances from the sound source of a particular sound to the microphones in an ingenious manner.

This is because, in a case where particular-sound detection is performed by using a plurality of microphones, the degree to which false detection is solved varies depending on the number of microphones to be used for particular-sound detection, and the arrangement of the microphones. Several examples are explained below specifically.

Example in which Two Microphones are Arranged at L and R

In the example explained first, two microphones are used for particular-sound detection, and the two microphones are arranged at an L position and an R position, that is, positions on the left and right as seen from a headphone wearer, to thereby make false detection less likely to occur.

Figure 2:
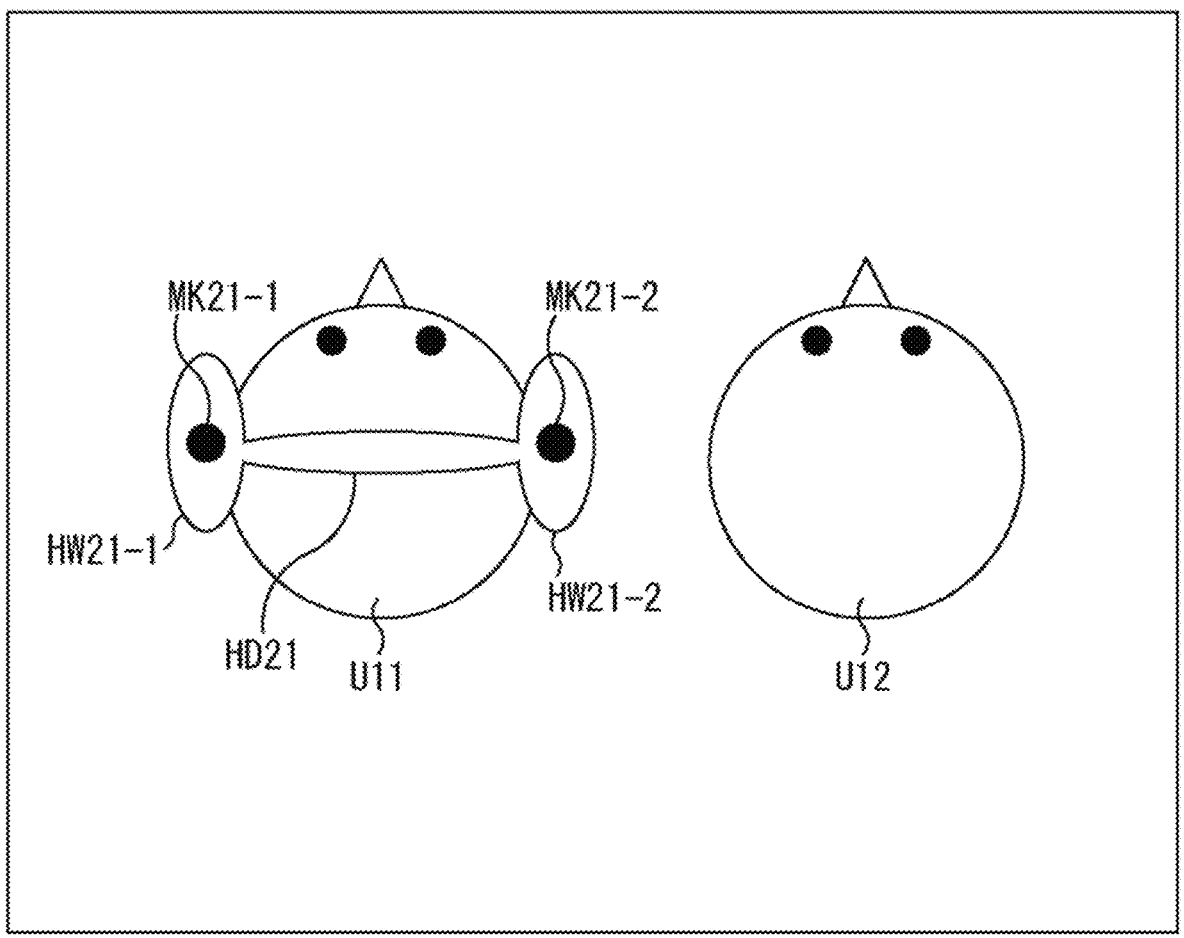
FIG. 2 is a figure depicting an example of the arrangement of microphones in the headphones.

In this case, as depicted in FIG. 2, for example, overhead headphones HD21 are provided with a microphone MK21-1 and a microphone MK21-2. Note that sections in FIG. 2 that have counterparts in FIG. 1 are given the same reference signs, and explanations thereof are omitted as appropriate.

In this example, the user U11, who is a headphone wearer, has the headphones HD21 on, and there is the user U12, who is not a headphone wearer, near the user U11.

In addition, the microphone MK21-1 is provided at a left housing section HW21-1 of the headphones HD21 that is worn on the left ear of the user U11. Further, the microphone MK21-2 is provided at a right housing section HW21-2 of the headphones HD21 that is worn on the right ear of the user U11.

Stated differently, the microphone MK21-1 is arranged on the left side as seen from the user U11, and the microphone MK21-2 is arranged on the right side as seen from the user U11.

Note that, in a case below where it is not particularly necessary to distinguish between the microphone MK21-1 and the microphone MK21-2, they are also called microphones MK21 simply. In addition, in a case below where it is not particularly necessary to distinguish between the housing section HW21-1 and the housing section HW21-2, they are also called housing sections HW21 simply.

Here, the microphones MK21 are provided outside the outer circumference of the housing sections HW21 of the headphones HD21. That is, the microphones MK21 have sensor sections which are for collecting sounds, and not covered by housings, and the microphones MK21 are provided to be exposed externally.

In addition, the microphones MK21 are feed-forward microphones for realizing a noise canceling functionality, or the like, for example.

The feed-forward microphones are microphones for feed-forward control in noise canceling, and the feed-forward microphones are used not only for noise canceling, but also for particular-sound detection.

Further, the two microphones MK21 are arranged such that their distances from the mouth of the user U11 to be the sound source position of a particular sound are approximately equal in a state in which the user U11 has the headphones HD21 on.

In the example depicted in FIG. 2, the distance from the mouth of the user U11, who is a headphone wearer, to the microphone MK21-2, and the distance from the mouth of the user U12, who is not a headphone wearer, to the microphone MK21-2 are approximately the same distances. However, the distance from the mouth of the user U11 to the microphone MK21-1, and the distance from the mouth of the user U12 to the microphone MK21-1 are different distances.

Stated differently, while the microphone MK21-1 and the microphone MK21-2 are arranged at positions which are approximately equidistant from the mouth of the user U11, which is the sound source of a particular sound, the positions of the microphones MK21 are not positions that are equidistant from the mouth of the user U12.

Accordingly, in a case where the voice of the user U11, who is a headphone wearer, is acquired (collected) by the microphone MK21-1 and the microphone MK21-2, the sound pressures of audio signals obtained by the microphones MK21 are approximately the same.

In contrast, in a case where the voice of the user U12, who is not a headphone wearer, is acquired (collected) by the microphone MK21-1 and the microphone MK21-2, the sound pressures of audio signals obtained by the microphones MK21 are different sound pressures.

In such a manner, in a case where the two microphones MK21 are arranged at the left and right L position and R position, the occurrence of false detection mentioned above can be suppressed by performing machine learning of a detector by using audio signals acquired by those two microphones MK21.

That is, by using the detector obtained by machine learning, it is possible to perform particular-sound detection by using the difference between the sound pressures of audio signals acquired by the microphones MK21 arranged at positions which are mutually different positions, and are at approximately equal distances from the sound source of a particular sound. Thereby, the detection performance can be improved.

Figure 3:
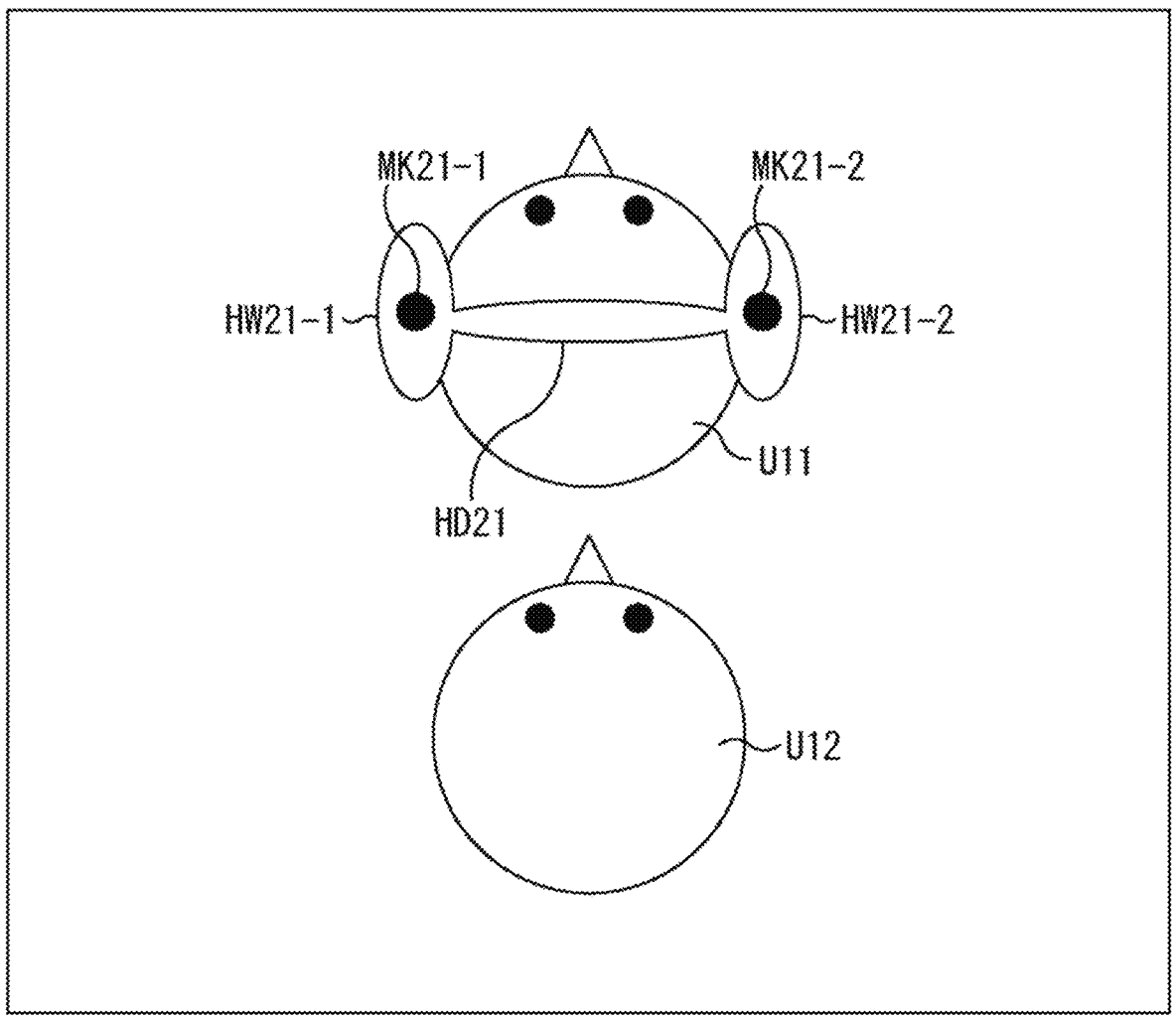
FIG. 3 is a figure for explaining particular-sound detection by using the microphones.

However, as depicted in FIG. 3, for example, false detection can occur in a case where the user U12, who is not a headphone wearer, is on the midline of the user U11, who is a headphone wearer. Note that sections in FIG. 3 that have counterparts in FIG. 2 are given the same reference signs, and explanations thereof are omitted as appropriate.

Because the user U12 is on the midline of the user U11 in the example depicted in FIG. 3, the distance from the mouth of the user U12 to the microphone MK21-1, and the distance from the mouth of the user U12 to the microphone MK21-2 are approximately equal in this state.

For example, such a case can occur in a case where there is the user U12 behind the user U11 on a train, near a railroad crossing, and so on, or in other cases. In addition, on a train and so on, human voices such as announcement sounds are reproduced above the user U11 in some cases, and in such a case also, a case where the sound source of an announcement sound or the like is positioned on the midline of the user U11 can occur.

In such a case, when the voice of the user U12 is acquired by the microphone MK21-1 and the microphone MK21-2, the sound pressures of audio signals obtained by the microphones MK21 become approximately the same, and so there is a fear that false detection mentioned above occurs undesirably.

About Example in which Three Microphones are Arranged at L, R and BTM

Figure 4:
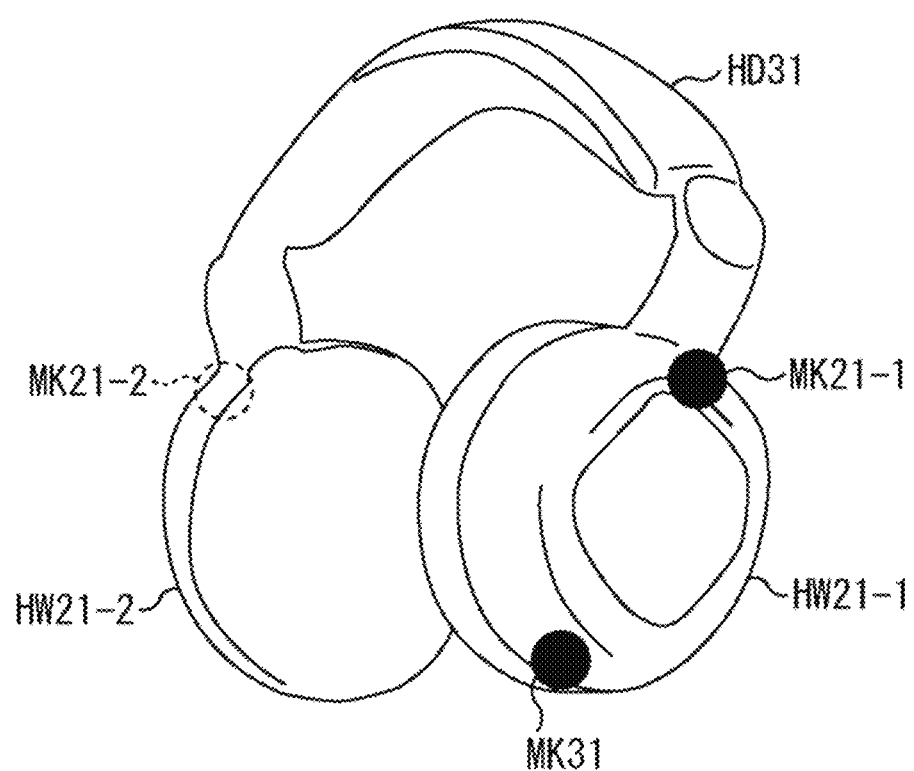
FIG. 4 is a figure depicting an example of the arrangement of microphones in the headphones.

In view of this, as depicted in FIG. 4, for example, overhead headphones HD31 may be provided with three microphones, the microphones MK21-1 and microphone MK21-2, and a microphone MK31. Note that sections in FIG. 4 that have counterparts in FIG. 2 are given the same reference signs, and explanations thereof are omitted as appropriate.

In the example depicted in FIG. 4, the microphone MK21-1 is provided at the left housing section HW21-1 of the headphones HD31, and the microphone MK21-2 is provided at the right housing section HW21-2 of the headphones HD31.

In particular, in this example, the microphone MK21-1 and the microphone MK21-2 are arranged at the same height position as seen from the user U11 in a state in which the user U11 has the headphones HD31 on his/her head.

In addition, the microphone MK31 is provided at a position lower than the microphone MK21-1 in the figure of the left housing section HW21-1, that is, at a BTM position (bottom position).

For example, the microphone MK31 is used as a microphone for calls that is provided outside the outer circumference of the housing section HW21-1, and is for calls by using a telephone or the like, or the like.

In addition, the microphone MK31 is arranged at a position closer to the mouth of the user U11 than the microphones MK21 are, in a state in which the user U11 has the headphones HD31 on his/her head. That is, the microphone MK31 is arranged at a position which is at a shorter distance from the mouth of the user U11 than the distances from the microphones MK21 to the mouth of the user U11.

Accordingly, in a case where the voice of the user U11, who is a headphone wearer, is acquired by the two microphones MK21 and the one microphone MK31, the sound pressures of audio signals obtained by the two microphones MK21 are approximately the same.

However, in this case, the sound pressure of an audio signal obtained by the microphone MK31 is higher than the sound pressures of the audio signals obtained by the two microphones MK21.

That is, while the voice of the user U11, who is a headphone wearer, is input to the two microphones MK21 at approximately the same sound pressures, the sound pressure of the voice of the user U11 is input to the microphone MK31 at a sound pressure higher than those for the microphones MK21.

This is because, as mentioned above, the microphone MK31 is arranged at a position closer to the mouth of the user U11 than the microphones MK21 are, in a state in which the user U11 has the headphones HD31 on his/her head.

Accordingly, as in the example depicted in FIG. 3, even in a case where the user U12, who is not a headphone wearer, is on the midline of the user U11, who is a headphone wearer, it becomes less likely for false detection mentioned above to occur in the headphones HD31.

That is, the headphones HD31 provided with the three microphones can attain higher detection performance as compared with the headphones HD21 provided with the two microphones.

Figure 5:
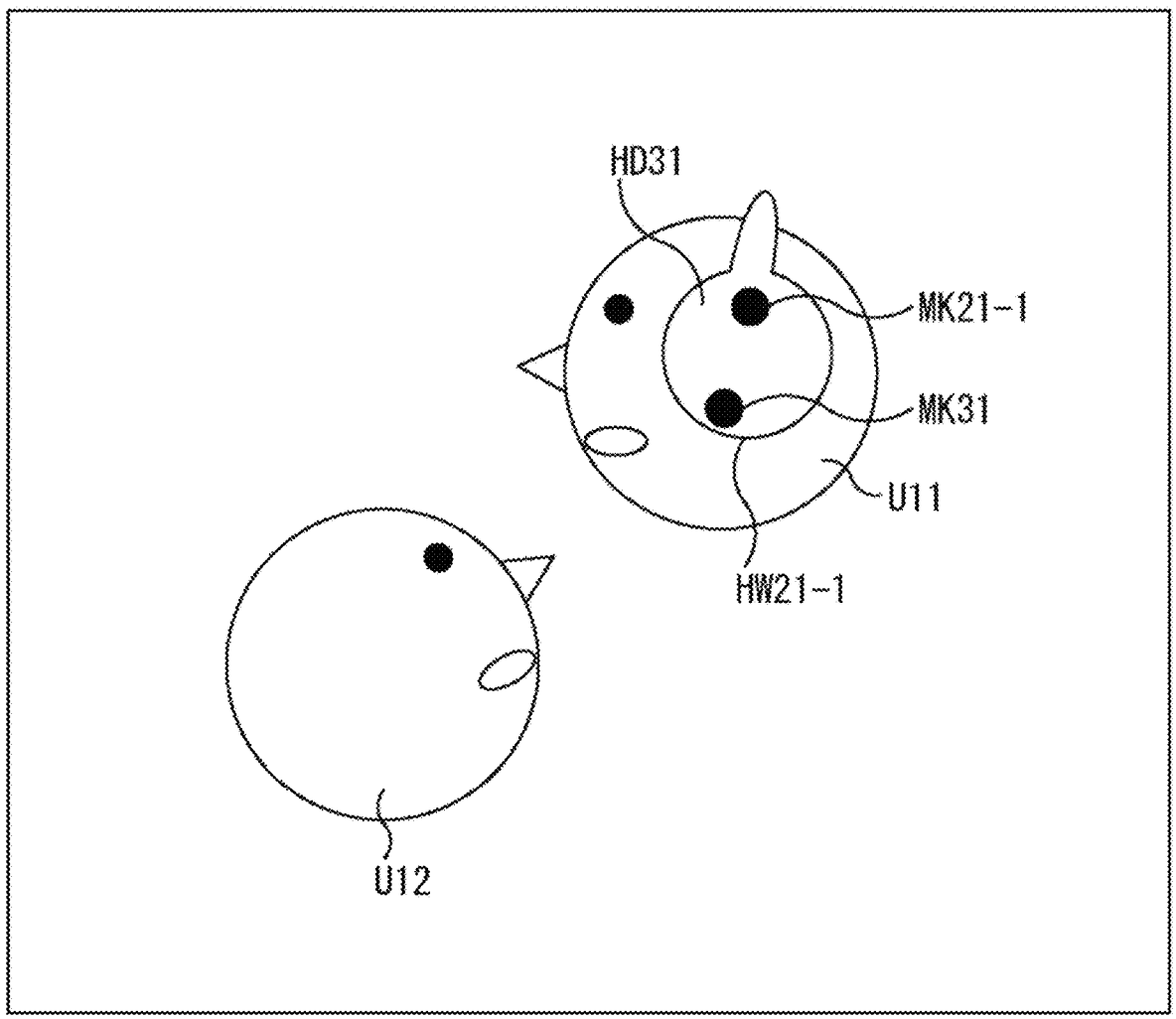
FIG. 5 is a figure for explaining particular-sound detection by using the microphones.

Meanwhile, as depicted in FIG. 5, for example, false detection can occur in a case where the user U12, who is not a headphone wearer, is below the user U11 and on the midline of the user U11, who is a headphone wearer. Note that sections in FIG. 5 that have counterparts in FIG. 3 or FIG. 4 are given the same reference signs, and explanations thereof are omitted as appropriate.

In the example depicted in FIG. 5, the user U12 is positioned on the midline of the user U11, and lower than the user U11. Such a positional relation between the user U12 and the user U11 can occur in a case where the user U11 is standing in front of the user U12 who is sitting on a seat on a train or the like, or in other cases.

In this example, the microphone MK31 is at a position closer to the mouth of the user U12 than the microphones MK21 are, and the two microphones MK21 are arranged at positions which are approximately equidistant from the mouth of the user U12.

Accordingly, in such a case, in a case where the voice of the user U12 is acquired by the microphones MK21 and the microphone MK31, the sound pressures of audio signals obtained by the two microphones MK21 are approximately the same.

In addition, the sound pressure of an audio signal obtained by the microphone MK31 is higher than the sound pressures of the audio signals obtained by the microphones MK21. As a result, similarly to the example depicted in FIG. 3, there is a fear that false detection occurs undesirably.

Example in which Four Microphones are Arranged at L, R, BTM and TOP

Figure 6:
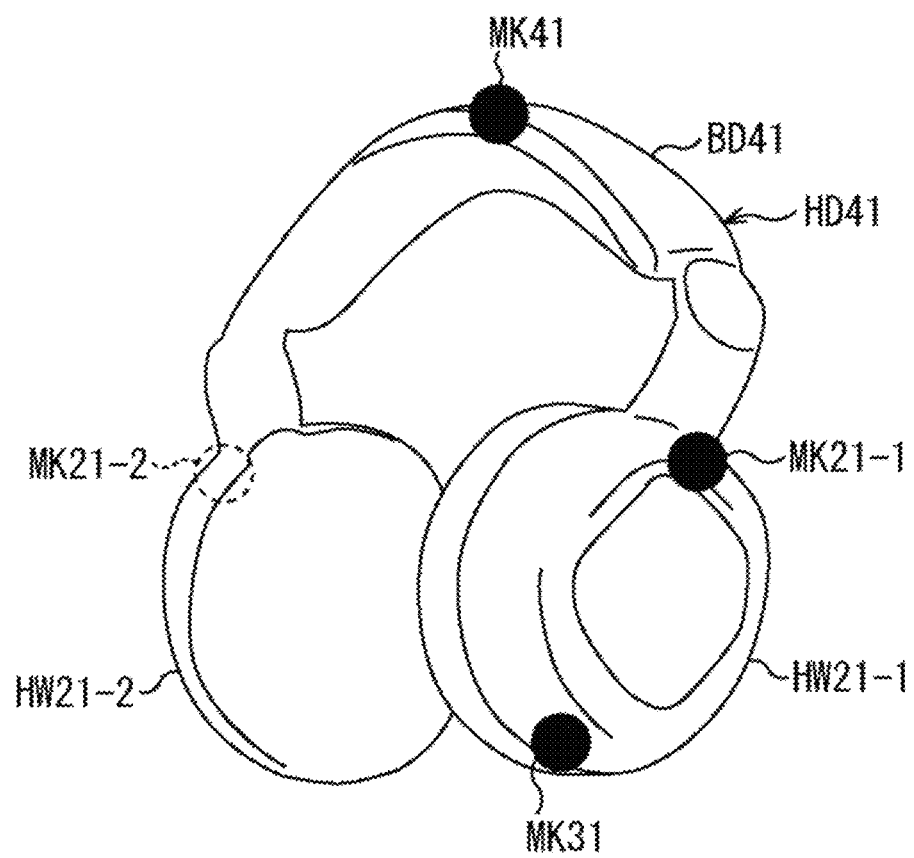
FIG. 6 is a figure depicting an example of the arrangement of microphones in the headphones.

In view of this, as depicted in FIG. 6, for example, overhead headphones HD41 may be provided with four microphones, the microphones MK21-1, the microphone MK21-2, the microphone MK31, and a microphone MK41.

Note that sections in FIG. 6 that have counterparts in FIG. 4 are given the same reference signs, and explanations thereof are omitted as appropriate.

In the example depicted in FIG. 6, the microphone MK21-1 and the microphone MK31 are provided at the left housing section HW21-1 of the headphones HD41, and the microphone MK21-2 is provided at the right housing section HW21-2 of the headphones HD41. The arrangement of these microphone MK21 and microphone MK31 is similar to that in the case of FIG. 4.

In addition, in the headphones HD41, the microphone MK41 is arranged to be positioned higher than the microphone MK21 and the microphone MK31 as seen from the user U11 in a state in which the user U11 has the headphones HD41 on.

In particular, in this example, the microphone MK41 is arranged to be close to the top of the head of the user U11 (near the top of the head), that is, at a TOP position (top position) in a state in which the user U11 has the headphones HD41 on.

Specifically, in the headphones HD41, the microphone MK41 is provided at a position which is on a band section BD41 coupling (connecting) the two housing sections HW21, and is approximately equidistant from the two microphones MK21. This microphone MK41 is used as a microphone for particular-sound detection provided outside the band section BD41, for example.

In addition, in a state in which the user U11, who is a headphone wearer, has the headphones HD41 on his/her head, the distance from the mouth of the user U11 to the microphone MK21 is made approximately equal to the distance from the mouth of the user U11 to the microphone MK41. Stated differently, each of the two microphones MK21, and the microphone MK41 are arranged at positions that are approximately equidistant from the mouth of the user U11, which is the sound source of a particular sound.

With such a microphone arrangement, in a case where the voice of the user U11, who is a headphone wearer, is acquired by each microphone, the sound pressures of audio signals obtained by the three microphones in total, the two microphones MK21 and the microphone MK41, become approximately the same.

In addition, the sound pressure of an audio signal obtained by the microphone MK31 is higher than the sound pressures of the audio signals obtained by the microphones MK21 and the microphone MK41.

On the other hand, if it is attempted to obtain, about the voice of the user U12, who is not a headphone wearer, a relation similar to that in the case of the voice of the user U11 as a relative relation between the sound pressures of audio signals obtained by the microphones, the user U12 has to utter a sound in a state in which the position of the mouth of the user U12 is extremely close to the position of the mouth of the user U11.

However, the probability (the probability of occurrence) that the user U12, who is not a headphone wearer, utters a sound in such a state in the normal actual life is low, and so false detection rarely occurs in the headphones HD41. That is, the headphones HD41 provided with the four microphones can attain still higher detection performance as compared with the headphones HD31 provided with the three microphones.

Example in which Four Microphones are Arranged at L, R, FBL and FBR

Meanwhile, there are some headphones in which feedback microphones for noise canceling are arranged inside the housings of the headphones.

Figure 7:
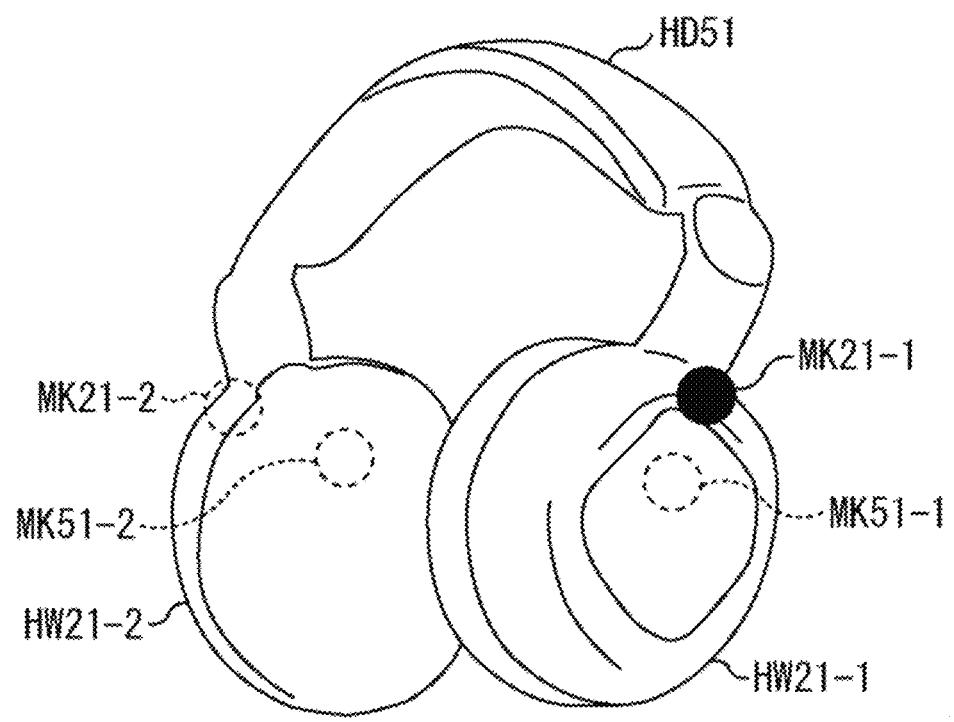
FIG. 7 is a figure depicting an example of the arrangement of microphones in the headphones.

In view of this, as depicted in FIG. 7, for example, overhead headphones HD51 may be provided with the two microphones MK21, and a microphone MK51-1 and a microphone MK51-2 that are feedback microphones for noise canceling. Note that sections in FIG. 7 that have counterparts in FIG. 4 are given the same reference signs, and explanations thereof are omitted as appropriate.

In the example depicted in FIG. 7, the microphone MK21-1 is provided at the left housing section HW21-1 of the headphones HD51, and the microphone MK21-2 is provided at the right housing section HW21-2 of the headphones HD51. This arrangement of the microphones MK21 is similar to that in the case in FIG. 4.

Further, in the headphones HD51, the microphone MK51-1, which is a feedback microphone, is arranged at a position inside the left housing section HW21-1, that is, at a position (FBL position) inside a housing forming the housing section HW21-1. Stated differently, the microphone MK51-1 is covered by the housing forming the housing section HW21-1.

More specifically, for example, the microphone MK51-1 is arranged at a position between a diaphragm of a speaker which is not depicted, but is provided inside the housing section HW21-1, and a mesh protective member that protects the diaphragm by covering the diaphragm, or at another position. Here, the protective member functions also as a housing.

The feedback microphones are microphones for feedback control in noise canceling, and the feedback microphones are used not only for noise canceling, but also for particular-sound detection in this example.

Similarly, the microphone MK51-2, which is a feedback microphone, is arranged at a position (FBR position) inside a housing forming the right housing section HW21-2.

Note that, in a case below where it is not particularly necessary to distinguish between the microphone MK51-1 and the microphone MK51-2, they are also called microphones MK51 simply.

Because the microphones MK51 are covered by the housings of the headphones HD51, the microphones MK51 rarely receive (collect) inputs of external sounds including human voices other than the voice of the user U11, who is a headphone wearer. That is, the microphones MK51 rarely collect sounds that are propagated in the air from the outside of the housing sections HW21.

On the other hand, if the user U11, who is a headphone wearer, utters a sound, the microphones MK51 receive (collect) inputs of an individual vibration sound of the user U11 resulting from the utterance of the user U11, who is a headphone wearer. That is, the microphones MK51 collect a vibration sound generated by the utterance of the user U11.

Accordingly, it becomes possible, on the basis of audio signals obtained by the microphones MK21 and the microphones MK51, to distinguish between the voice of the user U11, more specifically the vibration sound generated by the utterance of the user U11, and other human voices such as the voice of the user U12.

Thereby, for example, also in a case where the user U12 utters a sound in a state in which the position of the mouth of the user U12 is at a position extremely close to the mouth of the user U11 and in other cases, false particular-sound detection rarely occurs, and high detection performance can be attained.

Note that, while feedback microphones are mainly used as microphones for collecting an individual vibration sound of the user U11 in the example explained here, an individual vibration sound of the user U11 may be collected by using other microphones such as bone conduction microphones. That is, bone conduction microphones or the like may be used as the microphones MK51, for example.

Example in which Two Microphones are Arranged at L and FBL or R and FBR

In addition, if four microphones in total, the two microphones MK21 and the two microphones MK51 are used as explained with reference to FIG. 7, it becomes possible to make false particular-sound detection less likely to occur, and to attain high performance of detecting particular sounds.

However, as the number of microphones provided to headphones increases, the power consumption, and the amount of memory necessary for particular-sound detection increase undesirably by amounts corresponding to the increase of the number of microphones.

In view of this, the power consumption and the amount of memory may be kept low, and the occurrence of false detection may be suppressed, for example, by performing particular-sound detection by using two microphones in total, one feed-forward microphone, and one feedback microphone.

Specifically, the microphone MK21-1, which is a feed-forward microphone provided to the left housing section HW21-1, and the microphone MK51-1, which is a feedback microphone provided to the left housing section HW21-1, may be used for particular-sound detection.

In this case, it is not particularly necessary to provide other microphones such as the microphone MK21-2 or the microphone MK51-2 to the headphones.

Conversely, the microphone MK21-2, which is a feed-forward microphone provided to the right housing section HW21-2, and the microphone MK51-2, which is a feedback microphone provided to the right housing section HW21-2, may be used for particular-sound detection. In this case also, it is not necessary to provide other microphones to the headphones.

If one feed-forward microphone, and one feedback microphone are used for particular-sound detection in this way, the balance between the performance of detecting particular sounds, and the suppression of increases of power consumption and the amount of memory (cost-effectiveness) can be enhanced. That is, it is possible to make the power consumption and the amount of memory approximately the same as those in the example explained with reference to FIG. 2, and to attain sufficiently high detection performance.

Example of Application to True Wireless Headphones

Figure 8:
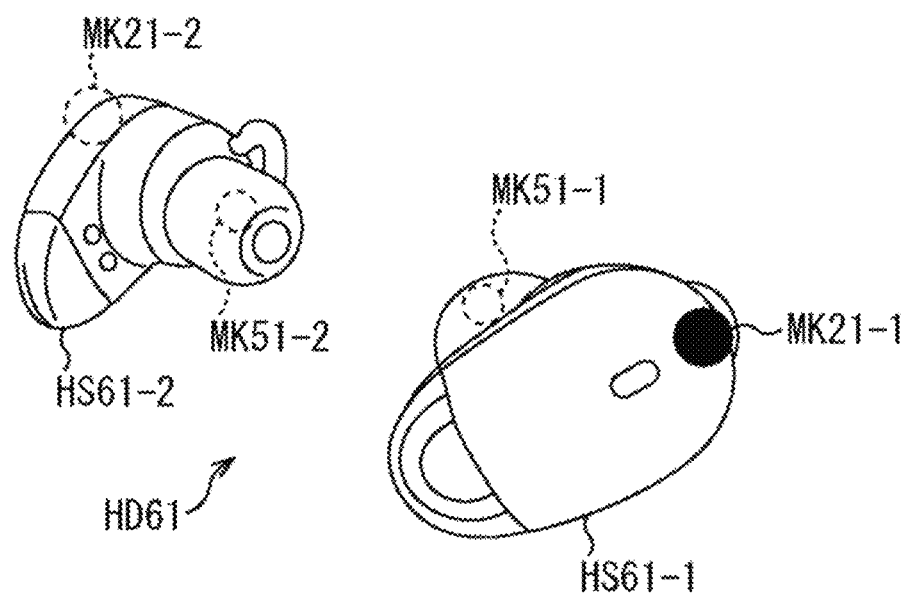
FIG. 8 is a figure depicting an example of the arrangement of microphones in the headphones.

Other than them, as depicted in FIG. 8, for example, also in a case where, as a wearable device, true wireless headphones HD61 are used for particular-sound detection, it is possible to attain sufficiently high detection performance while the power consumption and the amount of memory are kept low. Note that sections in FIG. 8 that have counterparts in FIG. 7 are given the same reference signs, and explanations thereof are omitted as appropriate.

In the example depicted in FIG. 8, the true wireless headphones HD61 includes a left headset HS61-1 worn on the left ear of a user, that is, the user U11 mentioned above, and a right headset HS61-2 worn on the right ear of the user.

Note that, in a case below where it is not particularly necessary to distinguish between the headset HS61-1 and the headset HS61-2, they are also called headsets HS61 simply.

Here, the left headset HS61-1 is provided with the microphone MK21-1, which is a feed-forward microphone for noise canceling, and the microphone MK51-1, which is a feedback microphone for noise canceling.

Similarly, the right headset HS61-2 is provided with the microphone MK21-2, which is a feed-forward microphone for noise canceling, and the microphone MK51-2, which is a feedback microphone for noise canceling.

The arrangement positions of these microphone MK21 and microphones MK51 are approximately similar to those in the case of FIG. 7. That is, the microphones MK21 are provided outside the headsets HS61, and the microphones MK51 are provided inside the headsets HS61.

In the example to be considered, one microphone MK21 and one microphone MK51 are used for particular-sound detection, for example.

In such a case, for example, the microphone MK21-1 and the microphone MK51-1 provided to the same left headset HS61-1 can be used for particular-sound detection. Note that, at this time, the microphone MK21-2 and the microphone MK51-2 may not be provided to the right headset HS61-2.

Similarly, the microphone MK21-2 and the microphone MK51-2 provided to the right headset HS61-2 may be used for particular-sound detection, for example.

By arranging two microphones for particular-sound detection on one headset HS61 in this way, it is possible to suppress the occurrence of false particular-sound detection, and to attain high detection performance even in headphones, like the true wireless headphones HD61, including left and right microphones, that is, independent left and right headsets.

In particular, in the true wireless headphones HD61, left and right microphones, for example, the microphone MK21-1 and the microphone MK21-2, are independent of each other. Stated differently, the left headset HS61-1 and the right headset HS61-2 are connected wirelessly, but are not connected by a cable.

Accordingly, for example, in a case where the microphone MK21-1 and the microphone MK21-2 are used for particular-sound detection, an audio signal obtained by one microphone MK21 needs to be transferred to a headset HS61 provided with the other microphone MK21 by wireless communication, and the transfer by wireless communication requires large power consumption.

In contrast, if a microphone MK21 and a microphone MK51 are arranged on one headset HS61 of the headphones HD61, and those microphones are used for particular-sound detection, the transfer by wireless communication mentioned above becomes unnecessary, and so it is possible to attain high detection performance while the power consumption is kept low.

Note that, while mainly the five examples are explained above as examples of the numbers and arrangements of microphones with reference to FIG. 2, FIG. 4, FIG. 6, FIG. 7 and FIG. 8, the present technology is not limited to these examples.

That is, as long as features such as sound pressures of audio signals obtained by a plurality of microphones can be made different between the voice of a headphone wearer, and the voices of humans other than the headphone wearer, the number of microphones used for particular-sound detection may be any number, and the arrangement of the microphones also may be any arrangement.

Figure 9:
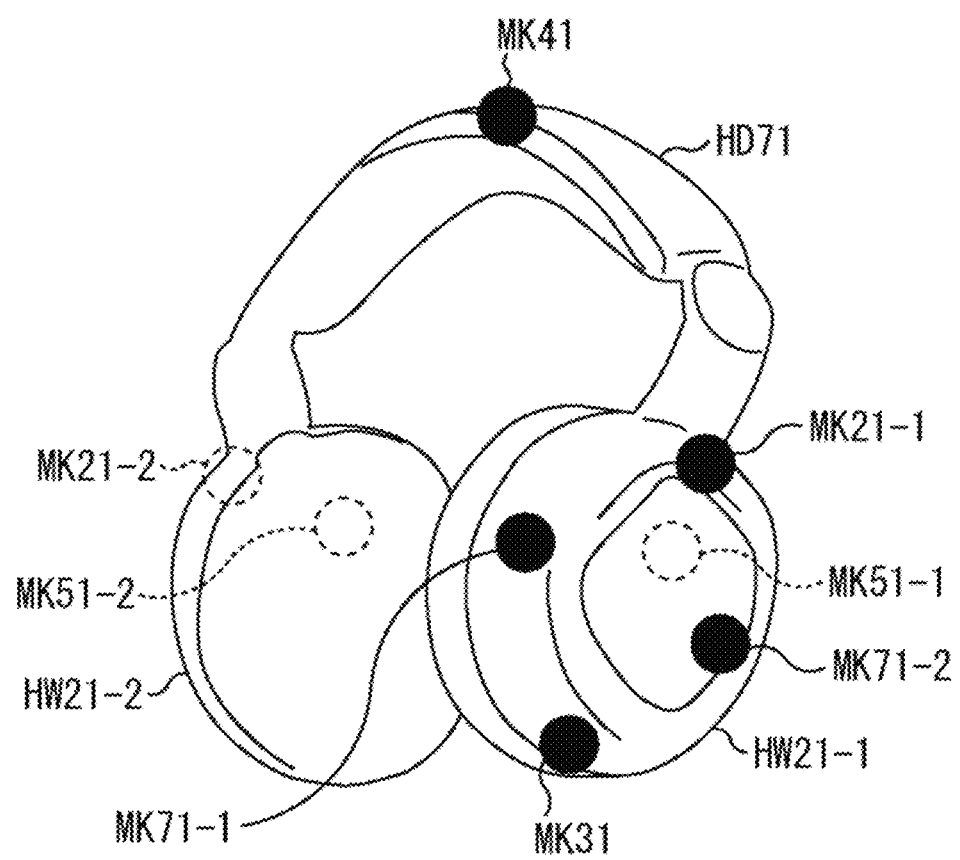
FIG. 9 is a figure depicting an example of the arrangement of microphones in the headphones.
Figure 10:
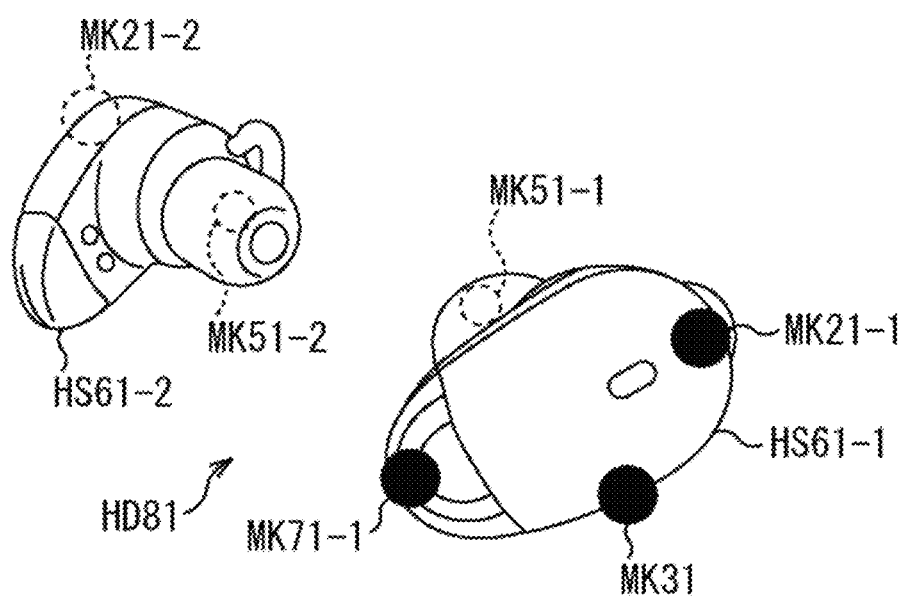
FIG. 10 is a figure depicting an example of the arrangement of microphones in the headphones.

Accordingly, microphone arrangements like the ones depicted in FIG. 9 and FIG. 10 may be adopted, for example.

For example, in the example depicted in FIG. 9, overhead headphones HD71 are provided with eight microphone, and any two or more of the eight microphones can be used for particular-sound detection. Note that sections in FIG. 9 that have counterparts in FIG. 6 or FIG. 7 are given the same reference signs, and explanations thereof are omitted as appropriate.

In this example, the headphones HD71 are provided with the two microphones MK21, the microphone MK31 and the microphone MK41 in the same arrangement as that in the case in FIG. 6, and provided with the two microphones MK51 in the same arrangement as that in the case in FIG. 7.

Further, in this example, a microphone MK71-1 and a microphone MK71-2 for calls are provided at height positions between the microphone MK21-1 and the microphone MK31 in the left housing section HW21-1.

Specifically, the microphone MK71-1 is provided at the FRT position outside the outer circumference of the housing section HW21-1, that is, at a position on the side of the face (mouth) of the user U11, who is a headphone wearer.

In contrast, the microphone MK71-2 is provided at the REA position outside the outer circumference of the housing section HW21-1, that is, at a position on the side of the back of the head of the user U11, who is a headphone wearer.

Note that, in a case below where it is not particularly necessary to distinguish between the microphone MK71-1 and the microphone MK71-2, they are also called microphones MK71 simply.

In addition, in the example depicted in FIG. 10, true wireless headphones HD81 are provided with six microphone, and any two or more of the six microphones can be used for particular-sound detection. Note that sections in FIG. 10 that have counterparts in FIG. 8 or FIG. 9 are given the same reference signs, and explanations thereof are omitted as appropriate.

In this example, the left headset HS61-1 of the headphones HD81 is provided with the microphone MK21-1, the microphone MK51-1, the microphone MK31 and the microphone MK71-1. In addition, the right headset HS61-2 of the headphones HD81 is provided with the microphone MK21-2 and the microphone MK51-2.

Further, while the voice of a headphone wearer is detected as a particular sound by headphones in the examples explained above, particular sounds to be detection targets are not limited to the voices of headphone wearers, but may be any other sound.

For example, the voice of a human who is not a headphone wearer, or an announcement sound may be detected as a particular sound, or moving sounds like driving sounds of vehicles driving around a headphone wearer, horn sounds emitted by vehicles (automobiles or bicycles) and the like, and the like may be detected as particular sounds.

The microphone arrangement suited for not detecting sounds other than particular sounds by an error differs depending on what type of sound a particular sound to be a detection target is. In the following, specific examples of the microphone arrangement for each particular sound are explained.

(Case where Voice of Human Other than Headphone Wearer is Detected)

First, an example in which the voice of a human other than a headphone wearer is detected as a particular sound is explained.

In such a case, it is effective, for particular-sound detection, to use microphones mentioned above which are the microphone MK21-1, which is a feed-forward microphone arranged at the L position, the microphone MK51-1, which is a feedback microphone arranged at the FBL position, the microphone MK31 for calls, which is arranged at the BTM position, and the microphone MK41 for particular-sound detection, which is arranged at the TOP position, for example.

In a case where the voice of a human other than a headphone wearer is to be detected as a particular sound, sounds that are often detected as a particular sound by an error with the microphone arrangement explained with reference to FIG. 2, for example, are mainly the voice of the headphone wearer, and announcement sounds on a train, at a platform of a station, on the street and so on.

The sound pressures (hereinafter, also called input sound pressures) of the voice of the headphone wearer, and the announcement sounds as inputs to the microphones have features like the ones mentioned below.

That is, regarding the voice of the headphone wearer, the input sound pressures of the microphone MK31 at the BTM position, and the microphone MK51-1 at the FBL position are high, and the input sound pressure of the microphone MK21-1 at the L position, and the input sound pressure of the microphone MK41 at the TOP position are approximately the same, and are both lower than the input sound pressure of the microphone MK31 at the BTM position.

On the other hand, regarding the voices of humans other than the headphone wearer which are a particular sound, the input sound pressures of the microphone MK31 at the BTM position, the microphone MK21-1 at the L position, and the microphone MK41 at the TOP position are approximately the same, and the input sound pressure of the microphone MK51-1 at the FBL position is extremely low.

In addition, regarding announcement sounds, the input sound pressure of the microphone MK41 at the TOP position is high, the input sound pressures of the microphone MK21-1 at the L position, and the microphone MK31 at the BTM position are lower than the input sound pressure of the microphone MK41 at the TOP position, and the input sound pressure of the microphone MK51-1 at the FBL position is extremely low.

In such a manner, the voices of humans other than the headphone wearer which are a particular sound, and the voice of the headphone wearer, and announcement sounds which are not particular sounds have different magnitude relations of input sound pressures at different microphones. Accordingly, if the voices of humans other than the headphone wearer are detected as a particular sound with a microphone arrangement like the one above, the particular sound can be detected without error, and with high detection performance.

(Case where Announcement Sounds are Detected)

Next, an example in which announcement sounds reproduced near a headphone wearer are detected as a particular sound is explained.

In such a case also, similarly to the case mentioned above that the voices of humans other than a headphone wearer are detected, for example, it is effective to use the microphone MK21-1, which is a feed-forward microphone arranged at the L position, the microphone MK51-1, which is a feedback microphone arranged at the FBL position, the microphone MK31 for calls, which is arranged at the BTM position, and the microphone MK41 for particular-sound detection, which is arranged at the TOP position.

This is because, as mentioned above, the announcement sounds, and the voices of humans other than the headphone wearer and the voice of the headphone wearer have different magnitude relations of input sound pressures at different microphones.

(Case where Moving Sounds are Detected)

Further, an example in which moving sounds are detected as a particular sound is explained.

In such a case, it is effective to use the microphone MK21-1, which is a feed-forward microphone arranged at the L position, the microphone MK21-2, which is a feed-forward microphone arranged at the R position, the microphone MK71-1 for calls, which is arranged at the FRT position, and the microphone MK71-2 for calls, which is arranged at the REA position, for example.

By using the microphones arranged on the front, back, left and right of the headphones in this way, it is possible to identify whether the sound source of a moving sound which is a particular sound is nearby or far away, and the movement direction of the sound source of the moving sound as to whether the sound source is moving away, or whether the sound source is approaching.

For example, the input sound pressures, at the microphones, of a moving sound whose sound source is far away from the headphones, and a moving sound whose sound source is near the headphones have feature like the ones mentioned below.

That is, regarding the moving sound whose sound source is far away from the headphones, the farther the position of the sound source is from the headphones, the more similar the input sound pressures of the microphone MK21-1 at the L position, the microphone MK21-2 at the R position, the microphone MK71-1 at the FRT position and the microphone MK71-2 at the REA position are, and the more similar temporal changes of the input sound pressures of the microphones are also.

In contrast, regarding the moving sound whose sound source is near the headphones, the closer the position of the sound source is to the headphones, the larger the differences of input sound pressures (sound pressure differences) among several microphones in the microphone MK21-1 at the L position, the microphone MK21-2 at the R position, the microphone MK71-1 at the FRT position, and the microphone MK71-2 at the REA position are, and the more similar temporal changes of the input sound pressures of all the microphones are.

In addition, in a case where the sound source of the moving sound is moving away from the headphones, temporal changes of the input sound pressures at the microphones are changes that make the input sound pressures smaller over time. Conversely, in a case where the sound source of the moving sound is approaching the headphones, temporal changes of the input sound pressures at the microphones are changes that make the input sound pressures larger over time.

Differences of the input sound pressures like the ones above, that is, features of the input sound pressures, make it possible to identify whether the sound source of a moving sound is far away from or near the headphones, whether the sound source is moving away, whether the sound source is approaching, and so on.

Note that the voice of a headphone wearer, the voices of humans other than the headphone wearer, announcement sounds, and moving sounds are detected as particular sounds in the examples explained above. However, a detector for detecting each of those sounds may be operated in parallel. In such a case, it is possible to combine microphones for obtaining audio signals to be input to detectors in different manners for different detectors, that is, for different particular sounds to be detection targets.

Further, while a particular sound is detected by using a detector such as a neural network obtained by machine learning in the examples explained above, the method for particular-sound detection may be any method as long as it uses a plurality of microphones.

Functional-Configuration Example of Headphones

Next, a specific embodiment in a case where the present technology explained above is applied to noise canceling headphones with a phone call functionality is explained.

The noise canceling headphones with a phone call functionality to which the present technology is applied (hereinafter, also called headphones simply) is configured as depicted in FIG. 11, for example.

Headphones 11 depicted in FIG. 11 are overhead, noise canceling headphones with a phone call functionality.

The headphones 11 have an L microphone 21, an R microphone 22, an FBL microphone 23, an FBR microphone 24, a BTM microphone 25, an FRT microphone 26, an REA microphone 27, a TOP microphone 28, a particular-sound detecting section 29, an external sound section 30, a recording section 31, a noise canceling section 32, a phone call section 33, a receiving section 34, a mode switching section 35, a control section 36, and a speaker 37.

Particularly in the headphones 11, a block section including at least the particular-sound detecting section 29 functions as a particular-sound detector that detects a particular sound. Accordingly, the particular-sound detector may include the control section 36 and the like, for example. Note that the particular-sound detector may be provided outside the headphones 11, and may acquire audio signals from the headphones 11 obtained by sound collection, and perform particular-sound detection.

The L microphone 21, the R microphone 22, the FBL microphone 23 and the FBR microphone 24 correspond to the microphone MK21-1, the microphone MK21-2, the microphone MK51-1 and the microphone MK51-2 depicted in FIG. 9, respectively.

That is, the L microphone 21 and the R microphone 22 are feed-forward microphones provided at the L position and the R position, respectively. The L microphone 21 and the R microphone 22 collect ambient sounds, and supply audio signals obtained thereby to the external sound section 30, the noise canceling section 32 and the particular-sound detecting section 29.

In addition, the FBL microphone 23 and the FBR microphone 24 are feedback microphones arranged at the FBL position and the FBR position, respectively. The FBL microphone 23 and the FBR microphone 24 collect ambient sounds, and supply audio signals obtained thereby to the noise canceling section 32 and the particular-sound detecting section 29.

The BTM microphone 25, the FRT microphone 26 and the REA microphone 27 are microphones for calls that are arranged at the BTM position, the FRT position and the REA position, respectively, and correspond to the microphone MK31, the microphone MK71-1 and the microphone MK71-2 depicted in FIG. 9. The BTM microphone 25 to the REA microphone 27 collect ambient sounds, and supply audio signals obtained thereby to the phone call section 33 and the particular-sound detecting section 29.

The TOP microphone 28 is a microphone for particular-sound detection arranged at the TOP position, and corresponds to the microphone MK41 depicted in FIG. 9. The TOP microphone 28 collects ambient sounds, and supplies audio signals obtained thereby to the particular-sound detecting section 29.

On the basis of audio signals supplied from the L microphone 21 to the TOP microphone 28, the particular-sound detecting section 29 detects a particular sound, and supplies a result of the detection to the control section 36.

The particular-sound detecting section 29 has a distributing section 51, a wearer-sound detecting section 52, a non-user-sound detecting section 53 and a moving-sound detecting section 54.

The distributing section 51 distributes audio signals supplied from the L microphone 21 to the TOP microphone 28 to the wearer-sound detecting section 52, the non-user-sound detecting section 53 and the moving-sound detecting section 54. That is, audio signals obtained by the microphones are allocated to the wearer-sound detecting section 52, the non-user-sound detecting section 53 and the moving-sound detecting section 54.

For example, the distributing section 51 supplies the wearer-sound detecting section 52 with audio signals supplied from the L microphone 21, the R microphone 22 and the BTM microphone 25.

In addition, for example, the distributing section 51 supplies the non-user-sound detecting section 53 with audio signals supplied from the L microphone 21, the FBL microphone 23, the BTM microphone 25 and the TOP microphone 28.

Further, for example, the distributing section 51 supplies the moving-sound detecting section 54 with audio signals supplied from the L microphone 21, the R microphone 22, the FRT microphone 26 and the REA microphone 27.

The wearer-sound detecting section 52 includes a detector including a neural network obtained by machine learning or the like, or the like, for example, that is, includes a detector with a neural network structure, or the like.

On the basis of audio signal supplied from the distributing section 51, the wearer-sound detecting section 52 detects, as a particular sound, the voice of the wearer of the headphones 11, and supplies a result of the detection to the control section 36.

For example, the detector included in the wearer-sound detecting section 52 is obtained in advance by machine learning or the like such that it uses, as inputs, audio signals obtained by collecting sounds by the microphones arranged at the L position, the R position and the BTM position to compute the probability that the voice of the wearer of the headphones 11, which is a particular sound, is included in the sounds based on those audio signals, and output the probability as a result of particular-sound detection.

For example, the non-user-sound detecting section 53 includes a detector with a neural network structure obtained by machine learning or the like, detects, as a particular sound, the voices of humans other than the wearer of the headphones 11 on the basis of audio signals supplied from the distributing section 51, and supplies a result of the detection to the control section 36.

For example, the detector included in the non-user-sound detecting section 53 is obtained in advance by machine learning or the like such that it uses, as inputs, audio signals obtained by collecting sounds by the microphones arranged at the L position, the FBL position, the BTM position and the TOP position to compute the probability that the voices of humans other than the wearer of the headphones 11, which are a particular sound, are included in the sounds based on those audio signals, and output the probability as a result of particular-sound detection.

Further, for example, the moving-sound detecting section 54 includes a detector with a neural network structure obtained by machine learning or the like, detects, as a particular sound, particular moving sounds such as driving sounds or horn sounds of vehicles on the basis of audio signals supplied from the distributing section 51, and supplies a result of the detection to the control section 36.

For example, the detector included in the moving-sound detecting section 54 is obtained in advance by machine learning or the like such that it uses, as inputs, audio signals obtained by collecting sounds by the microphones arranged at the L position, the R position, the FRT position and the REA position to compute the probability that a moving sound, which is a particular sound, is included in the sounds based on those audio signals, and output the probability as a result of particular-sound detection.

Note that it is supposed that information representing results of particular-sound detection output from the wearer-sound detecting section 52 to the moving-sound detecting section 54 is information representing the values of probabilities in the range from 0% to 100%, for example. However, this is not the sole example, and the information representing results of particular-sound detection may be flag information or the like representing whether or not a particular sound is detected in collected sounds.

In addition, while three mutually different particular sounds are detected in the example explained here, the number of particular sounds to be detection targets of the particular-sound detecting section 29 may be one, or may be more than one.

The external sound section 30 converts audio signals supplied from the L microphone 21 and the R microphone 22 into external sound signals which represent external sounds (sounds from outside) around the headphones 11, and supplies the external sound signals to the control section 36.

The recording section 31 retains (has recorded therein) music signals for reproducing music, and supplies the retained music signals to the noise canceling section 32 and the control section 36 as necessary.

On the basis of audio signals supplied from the L microphone 21, the R microphone 22, the FBL microphone 23 and the FBR microphone 24, and music signals supplied from the recording section 31, the noise canceling section 32 generates noise cancel signals for canceling sounds (external sounds) around the headphones 11, and supplies the noise cancel signals to the control section 36.

Specifically, for example, the noise canceling section 32 generates, as inverted signals, signals that are based on audio signals supplied from the L microphone 21 and the R microphone 22, but have inverted phase. In addition, the noise canceling section 32 generates difference inverted signals by subtracting music signals from audio signals supplied from the FBL microphone 23 and the FBR microphone 24, and inverting the phase of the signals obtained thereby. Then, the noise canceling section 32 adds together the thus-obtained inverted signals and difference inverted signals to generate noise cancel signals.

The phone call section 33 generates call signals by adding together audio signals from the BTM microphone 25, the FRT microphone 26 and the REA microphone 27, and sound signals of the person whom the wearer of the headphones 11 is talking with on the phone supplied from the receiving section 34, and supplies the call signals to the control section 36.

The receiving section 34 receives sound signals of a sound of the person whom the wearer of the headphones 11 is talking with on the phone transmitted by wireless communication from equipment such as a mobile phone operated by the person whom the wearer of the headphones 11 is talking with on the phone, and supplies the sound signals to the phone call section 33.

The mode switching section 35 switches the operation mode of the headphones 11 to either a music reproduction mode or a call mode, and supplies the control section 36 with identification information representing the selected operation mode.

For example, the music reproduction mode is an operation mode in which music is reproduced on the basis of music signals retained in the recording section 31 in the headphones 11. In contrast, the call mode is an operation mode that realizes voice calls between the wearer of the headphones 11, and the person whom the wearer is talking with on the phone.

The control section 36 controls the overall operation of the headphones 11.

For example, on the basis of detection results from the wearer-sound detecting section 52 to the moving-sound detecting section 54, and identification information from the mode switching section 35, the control section 36 performs weighted addition of an external sound signal from the external sound section 30, a music signal from the recording section 31, a noise cancel signal from the noise canceling section 32, and a call signal from the phone call section 33 to thereby generate a weighted sum signal. In addition, the control section 36 supplies the obtained weighted sum signal to the speaker 37.

The speaker 37 outputs a sound on the basis of a weighted sum signal supplied from the control section 36. Thereby, for example, music, call voices of a conversation between the wearer and the person whom the wearer is talking with on the phone, and the like are reproduced.

For example, in the weighted addition of an external sound signal, a music signal, a noise cancel signal and a call signal performed at the control section 36, the computation of the following Formula (1) is performed to compute (generate) a weighted sum signal sig_w[i].

[Math. 1]

$$\text{sig\_w}[i]=A\times\text{sig\_ambient}[i]+M\times\text{sig\_music}[i]+N\times\text{sig\_noise}[i]+T\times\text{sig\_tel}[i] \quad (1)$$

Note that i in Formula (1) represents a time sample index of each signal. In addition, sig_ambient[i], sig_music[i], sig_noise[i] and sig_tel[i] in Formula (1) represent an external sound signal, a music signal, a noise cancel signal and a call signal, respectively.

Further, A, M, N and T in Formula (1) represent weighting factors. For example, the weighting factors A, M, N and T are decided on the basis of identification information representing the operation mode, and results of particular-sound detection from the wearer-sound detecting section 52 to the moving-sound detecting section 54.

Specifically, for example, it is supposed that the operation mode represented by identification information is the music reproduction mode, and all the probabilities representing results of particular-sound detection supplied from the wearer-sound detecting section 52 to the moving-sound detecting section 54 are lower than 90%. It is supposed here that the control section 36 determines that a particular sound has been detected when the probabilities representing results of particular-sound detection are equal to or higher than "90%" which is a predetermined threshold.

In such a case, the control section 36 performs the computation of Formula (1) by using the weighting factors A=0.0, M=1.0, N=1.0 and T=0.0.

In this example, the operation mode is the music reproduction mode, and none of the voice of the wearer of the headphones 11, the voices of humans other than the wearer of the headphones 11, and moving sounds is detected from around the headphones 11. In view of this, the control section 36 calculates the weighted sum signal sig_w[i] by adding together only a music signal sig_music[i] and a noise cancel signal sig_noise[i] at the same weight.

By doing so, if the speaker 37 reproduces a sound on the basis of the weighted sum signal sig_w[i], noise canceling is realized, only music is heard by the wearer of the headphones 11, and the wearer (user) can concentrate on the music being reproduced. That is, in this case, an external sound, which is noise, is cancelled by a sound based on the noise cancel signal sig_noise[i], and the music is reproduced by the music signal sig_music[i].

In addition, for example, it is supposed that the probability represented by a detection result from the wearer-sound detecting section 52 or a detection result from the non-user-sound detecting section 53 is equal to or higher than 90%, and the operation mode represented by identification information is the music reproduction mode.

That is, it is supposed that, when in the music reproduction mode, the voice of the wearer of the headphones 11, or the voice of a human other than the wearer of the headphones 11 has been detected as a particular sound.

In such a case, the control section 36 performs the computation of Formula (1) by using the weighting factors A=0.5, M=0.5, N=0.0 and T=0.0. Accordingly, in this case, the weighted sum signal sig_w[i] is calculated by adding together only an external sound signal sig_ambient[i] and the music signal sig_music[i] at the same weight.

By doing so, if the speaker 37 reproduces a sound on the basis of the weighted sum signal sig_w[i], the noise canceling functionality is temporarily stopped, and an external sound, that is, the voices of the wearer of the headphones 11, and a human other than the wearer are also reproduced simultaneously along with music. Thereby, it is possible to make not only the music, but also the external sounds heard clearly by the wearer of the headphones 11, and it is made easier for the wearer to have a conversation with a non-user.

Further, for example, it is supposed that the operation mode represented by identification information is the music reproduction mode, and the probability representing a result of detection of a particular sound (moving sound) supplied from the moving-sound detecting section 54 is equal to or higher than 90%. That is, it is supposed that a moving sound is detected around the headphones 11.

In such a case, the control section 36 performs the computation of Formula (1) by using the weighting factors A=1.0, M=0.0, N=0.0 and T=0.0. Accordingly, in this case, the external sound signal sig_ambient[i] is directly calculated as the weighted sum signal sig_w[i].

By doing so, if the speaker 37 reproduces a sound on the basis of the weighted sum signal sig_w[i], only an external sound, that is, a moving sound, is heard by the wearer of the headphones 11. Thereby, it becomes possible for the wearer of the headphones 11 to clearly hear moving sounds such as driving sounds or horn sounds of vehicles which are external sounds, and to sense a danger easily.

In addition, for example, it is supposed that the operation mode represented by identification information is the call mode, and the probability representing a result of detection of a particular sound (moving sound) supplied from the moving-sound detecting section 54 is lower than 90%. That is, it is supposed that it is determined that moving sounds are not detected around the headphones 11, and the environment around the wearer of the headphones 11 is safe.

In such a case, the control section 36 performs the computation of Formula (1) by using the weighting factors A=0.0, M=0.0, N=1.0 and T=1.0. Accordingly, in this case, the weighted sum signal sig_w[i] is calculated by adding together only noise cancel signal sig_noise[i] and a call signal sig_tel[i] at the same weight.

By doing so, if the speaker 37 reproduces a sound on the basis of the weighted sum signal sig_w[i], noise canceling is realized, and only a call voice of the person whom the wearer of the headphones 11 is talking with on the phone is heard by the wearer. Thereby, the wearer of the headphones 11 can concentrate on the voice call of the person whom the wearer is talking with on the phone.

Other than them, for example, it is supposed that the operation mode represented by identification information is the call mode, and the probability representing a result of detection of a particular sound (moving sound) supplied from the moving-sound detecting section 54 is equal to or higher than 90%. That is, it is supposed that a moving sound is detected around the headphones 11.

In such a case, the control section 36 performs the computation of Formula (1) by using the weighting factors A=1.0, M=0.0, N=0.0 and T=0.0. Accordingly, in this case, the external sound signal sig_ambient[i] is directly calculated as the weighted sum signal sig_w[i].

By doing so, if the speaker 37 reproduces a sound on the basis of the weighted sum signal sig_w[i], the voice call with the person whom the wearer is talking with on the phone is suspended, and only an external sound, that is, a moving sound, is heard by the wearer of the headphones 11.

Thereby, it becomes possible for the wearer of the headphones 11 to clearly hear moving sounds such as driving sounds or horn sounds of vehicles which are external sounds, and to sense a danger easily.

As mentioned above, while operating in either of the operation modes, the control section 36 switches processes to be executed according to results of detection of one or more particular sounds. By doing so, it is possible to ensure the safety or make it easier to have a conversation appropriately according to the surrounding situation, and so it is possible to improve the usability of the headphones 11.

Explanation of Particular-Sound Detection Process

Next, a particular-sound detection process which is a process of detecting a particular sound by the headphones 11 is explained. That is, the particular-sound detection process by the headphones 11 is explained below with reference to the flowchart of FIG. 12.

At Step S11, the L microphone 21 to the TOP microphone 28 collect ambient sounds, and output audio signals obtained thereby.

Here, the audio signals obtained by the L microphone 21 to the TOP microphone 28 are supplied to the distributing section 51 and the like. Then, the distributing section 51 distributes the audio signals supplied from the L microphone 21 to the TOP microphone 28 to the wearer-sound detecting section 52, the non-user-sound detecting section 53 and the moving-sound detecting section 54.

At Step S12, the wearer-sound detecting section 52 to the moving-sound detecting section 54 detect particular sounds on the basis of the audio signals supplied from the distributing section 51, and supplies results of the detection to the control section 36.

For example, the wearer-sound detecting section 52 inputs the audio signals supplied from the distributing section 51, that is, audio signal obtained by the L microphone 21, the R microphone 22 and the BTM microphone 25, to a detector, and performs a calculation, to thereby compute the probability representing a result of detection of the voice of the wearer of the headphones 11 as a particular sound.

Similarly, the non-user-sound detecting section 53 and the moving-sound detecting section 54 also input audio signals supplied from the distributing section 51 to detectors, perform calculations, and obtain the probabilities representing results of detection of the voices of humans other than the wearer of the headphones 11, and moving sounds, as particular sounds.

At Step S13, on the basis of identification information supplied from the mode switching section 35, and the detection results supplied from the wearer-sound detecting section 52 to the moving-sound detecting section 54, the control section 36 performs a process according to the results of particular-sound detection, and ends the particular-sound detection process. Stated differently, the control section 36 switches a process to be executed according to the results of particular-sound detection.

For example, the control section 36 performs the computation of Formula (1) on the basis of the weighting factors decided on the basis of the identification information and the detection result as mentioned above, and supplies the weighted sum signal obtained thereby to the speaker 37, and makes the speaker 37 output a sound.

In the manner mentioned above, the headphones 11 collect ambient sounds by the plurality of microphones appropriately arranged, and detects particular sounds on the basis of audio signals obtained thereby. In such a manner, by using the plural microphones that are at appropriate arrangement positions, it is possible to suppress the occurrence of false detection, and to improve the performance of detecting particular sounds.

Configuration Example of Computer

Meanwhile, the series of the process mentioned above can be executed by hardware, and also can be executed by software. In a case where the series of the process is executed by software, a program included in the software is installed on a computer. Here, examples of the computer include a computer incorporated in dedicated hardware, a general-purpose personal computer, for example, that can execute various types of functionality by having various types of program installed thereon, and the like.

FIG. 13 is a block diagram depicting a configuration example of the hardware of a computer that executes the series of the process mentioned above by a program.

In the computer, a CPU (Central Processing Unit) 501, a ROM (Read Only Memory) 502, and a RAM (Random Access Memory) 503 are interconnected by a bus 504.

The bus 504 is further connected with an input/output interface 505. The input/output interface 505 is connected with an input section 506, an output section 507, a recording section 508, a communication section 509 and a drive 510.

The input section 506 includes a keyboard, a mouse, a microphone, an image-capturing element and the like. The output section 507 includes a display, a speaker and the like. The recording section 508 includes a hard disk, a nonvolatile memory and the like. The communication section 509 includes a network interface and the like. The drive 510 drives a removable recording medium 511 such as a magnetic disk, an optical disk, a magneto-optical disk or a semiconductor memory.

In the thus-configured computer, for example, the CPU 501 loads a program recorded in the recording section 508 into the RAM 503 via the input/output interface 505 and the bus 504, and executes the program, to thereby perform the series of the process mentioned above.

The program executed by the computer (CPU 501) can be provided being recorded in the removable recording medium 511 as a package medium or the like, for example. In addition, the program can be provided via a cable or wireless transfer medium like a local area network, the Internet and digital satellite broadcasting.

At the computer, the program can be installed on the recording section 508 via the input/output interface 505, by attaching the removable recording medium 511 to the drive 510. In addition, the program can be received at the communication section 509 via a cable or wireless transfer medium, and installed on the recording section 508. Other than these, the program can be installed in advance on the ROM 502 or the recording section 508.

Note that the program to be executed by the computer may be a program whose processes are performed in a temporal sequence in an order explained in the present specification, or may be a program whose processes are performed in parallel, or at necessary timings such as when the processes are called.

In addition, embodiments according to the present technology are not limited to the embodiments mentioned above, and can be changed in various manners within the scope not deviating from the gist of the present technology.

For example, the present technology can have a cloud computing configuration in which one functionality is processed by a plurality of devices via a network in a shared manner in corporation with each other.

In addition, each step explained with reference to the flowchart mentioned above can be executed by one device, or otherwise can be execute by a plurality of devices in a shared manner.

Further, in a case where one step includes a plurality of processes, the plurality of processes included in the one step can be executed by one device, or otherwise can be executed by a plurality of devices in a shared manner.

Further, the present technology can also have the following configurations.

(1)

A particular-sound detector including:

a particular-sound detecting section that detects a particular sound on a basis of a plurality of audio signals obtained by collecting sounds by a plurality of microphones provided to a wearable device, in which the plurality of the microphones includes two microphones that are equidistant at least from a sound source of the particular sound, and one microphone arranged at a predetermined position.

(2)

The particular-sound detector according to (1), in which the particular-sound detecting section includes a detector with a neural network structure.

(3)

The particular-sound detector according to (1) or (2), in which the particular sound is a voice of a wearer of the wearable device.

(4)

The particular-sound detector according to any one of (1) to (3), in which at least one microphone of the plurality of the microphones is a feedback microphone for noise canceling.

(5)

The particular-sound detector according to (4), in which the one microphone arranged at the predetermined position is the feedback microphone.

(6)

The particular-sound detector according to (4) or (5), in which the feedback microphone is arranged inside a housing of the wearable device.

(7)

The particular-sound detector according to any one of (1) to (3), in which at least one microphone of the plurality of the microphones is a bone conduction microphone.

(8)

The particular-sound detector according to (7), in which the one microphone arranged at the predetermined position is the bone conduction microphone.

(9)

The particular-sound detector according to any one of (1) to (3), in which at least one microphone of the plurality of the microphones is a microphone for calls.

(10)

The particular-sound detector according to (9), in which the one microphone arranged at the predetermined position is the microphone for calls.

(11)

The particular-sound detector according to (10), in which the predetermined position is a position at a distance from a mouth of a wearer of the wearable device, the distance being shorter than distances from the two microphones to the mouth of the wearer.

(12)

The particular-sound detector according to any one of (1) to (11), in which the two microphones are feed-forward microphones for noise canceling.

(13)

The particular-sound detector according to any one of (1) to (12), in which, in addition to the two microphones and the one microphone arranged at the predetermined position, the plurality of the microphones includes one microphone arranged near a top of a head of a wearer in a state in which the wearer has the wearable device on.

(14)

The particular-sound detector according to any one of (1) to (13), further including:

a control section that switches a process to be executed, according to a result of detection of the particular sound.

(15)

A particular-sound detection method including:

detecting, by a particular-sound detector, a particular sound on a basis of a plurality of audio signals obtained by collecting sounds by a plurality of microphones provided to a wearable device, in which the plurality of the microphones includes two microphones that are equidistant at least from a sound source of the particular sound, and one microphone arranged at a predetermined position.

(16)

A program that causes a computer to execute a process including a step of detecting a particular sound on a basis of a plurality of audio signals obtained by collecting sounds by a plurality of microphones provided to a wearable device, in which the plurality of the microphones includes two microphones that are equidistant at least from a sound source of the particular sound, and one microphone arranged at a predetermined position.

REFERENCE SIGNS LIST

11: Headphones
21: L microphone
22: R microphone
23: FBL microphone
24: FBR microphone
25: BTM microphone
26: FRT microphone
27: REA microphone
28: TOP microphone
29: Particular-sound detecting section
36: Control section
52: Wearer-sound detecting section
53: Non-user-sound detecting section
54: Moving-sound detecting section

The invention claimed is:

1. A particular-sound detector comprising:
processing circuitry configured to:
receive a particular sound on a basis of a plurality of audio signals obtained by collecting sounds by a plurality of microphones provided to a wearable device, wherein
the plurality of the microphones includes first and second microphones that are equidistant at least from a sound source of the particular sound, and a third microphone arranged at a predetermined position different from positions of the first and second microphones, and wherein receiving the particular sound includes processing signals received from the first, second or third microphones to determine whether or not the received signals include signals of the particular sound; and
control switching of a process to be executed, according to a result of detection of the particular sound.

2. The particular-sound detector according to claim 1, wherein the processing circuitry includes a detector with a neural network structure.

3. The particular-sound detector according to claim 1, wherein the particular sound is a voice of a wearer of the wearable device.

4. The particular-sound detector according to claim 1, wherein at least one microphone of the plurality of the microphones is a feedback microphone for noise canceling.

5. The particular-sound detector according to claim 4, wherein the third microphone arranged at the predetermined position is the feedback microphone.

6. The particular-sound detector according to claim 4, wherein the feedback microphone is arranged inside a housing of the wearable device.

7. The particular-sound detector according to claim 1, wherein at least one microphone of the plurality of the microphones is a bone conduction microphone.

8. The particular-sound detector according to claim 7, wherein the third microphone arranged at the predetermined position is the bone conduction microphone.

9. The particular-sound detector according to claim 1, wherein at least one microphone of the plurality of the microphones is a microphone for calls.

10. The particular-sound detector according to claim 9, wherein the third microphone arranged at the predetermined position is the microphone for calls.

11. The particular-sound detector according to claim 10, wherein the predetermined position is a position at a distance from a mouth of a wearer of the wearable device, the distance being shorter than distances from the two microphones to the mouth of the wearer.

12. The particular-sound detector according to claim 1, wherein the first and second microphones are feed-forward microphones for noise canceling.

13. The particular-sound detector according to claim 1, wherein, in addition to the first and second microphones and the third microphone arranged at the predetermined position, the plurality of the microphones includes one microphone arranged near a top of a head of a wearer in a state in which the wearer has the wearable device on.

14. A particular-sound detection method comprising:

receiving a particular sound on a basis of a plurality of audio signals obtained by collecting sounds by a plurality of microphones provided to a wearable device, wherein the plurality of the microphones includes first and second microphones that are equidistant at least from a sound source of the particular sound, and a third microphone arranged at a predetermined position different from positions of the first and second microphones, and wherein receiving the particular sound includes processing signals received from the first, second or third microphones to determine whether or not the received signals include signals of the particular sound; and controlling switching of a process to be executed, according to a result of detection of the particular sound.

15. A non-transitory computer readable medium storing instructions that, when executed by processing circuitry, perform a particular-sound detection method comprising:

receiving a particular sound on a basis of a plurality of audio signals obtained by collecting sounds by a plurality of microphones provided to a wearable device, wherein the plurality of the microphones includes first and second microphones that are equidistant at least from a sound source of the particular sound, and a third microphone arranged at a predetermined position different from positions of the first and second microphones, and wherein receiving the particular sound includes processing signals received from the first, second or third microphones to determine whether or not the received signals include signals of the particular sound; and controlling switching of a process to be executed, according to a result of detection of the particular sound.

\* \* \* \* \*